May 30, 1967  F. J. BORON  3,322,414
CONVEYOR APPARATUS
Filed March 1, 1965  4 Sheets-Sheet 1

Inventor
Frank J. Boron
By Wallace, Kinzer and Dorn
Attorneys

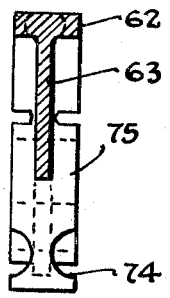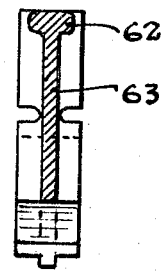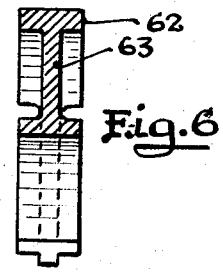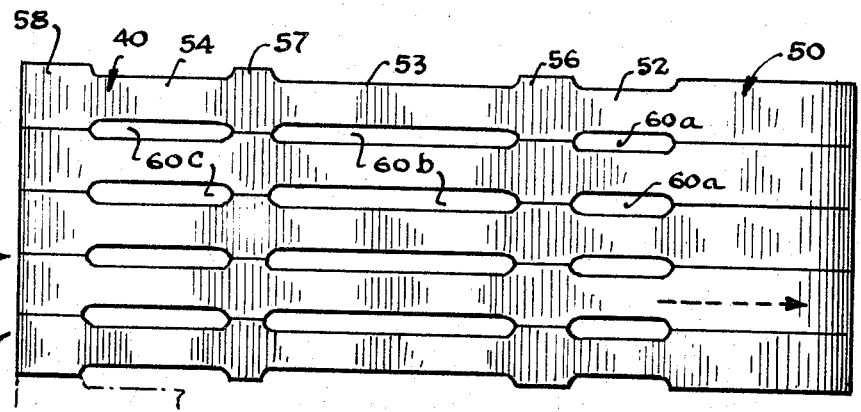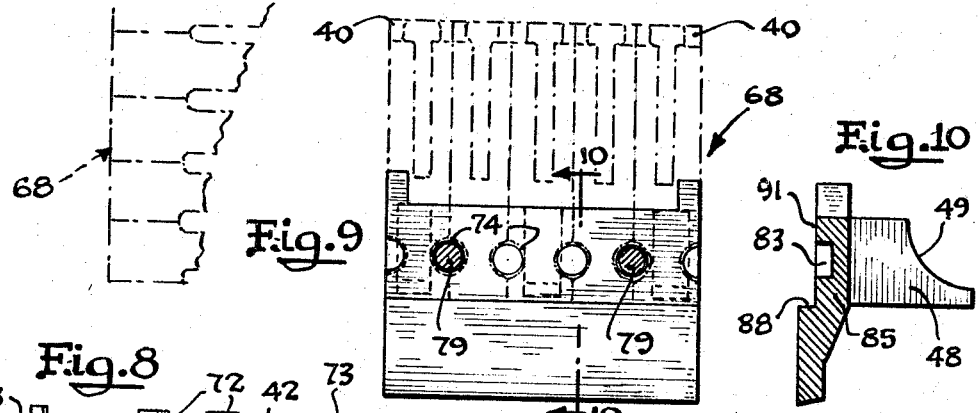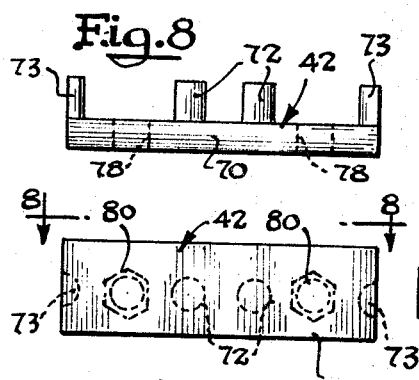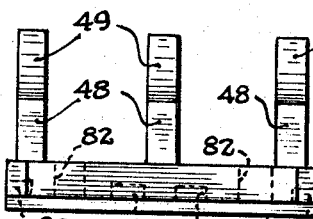

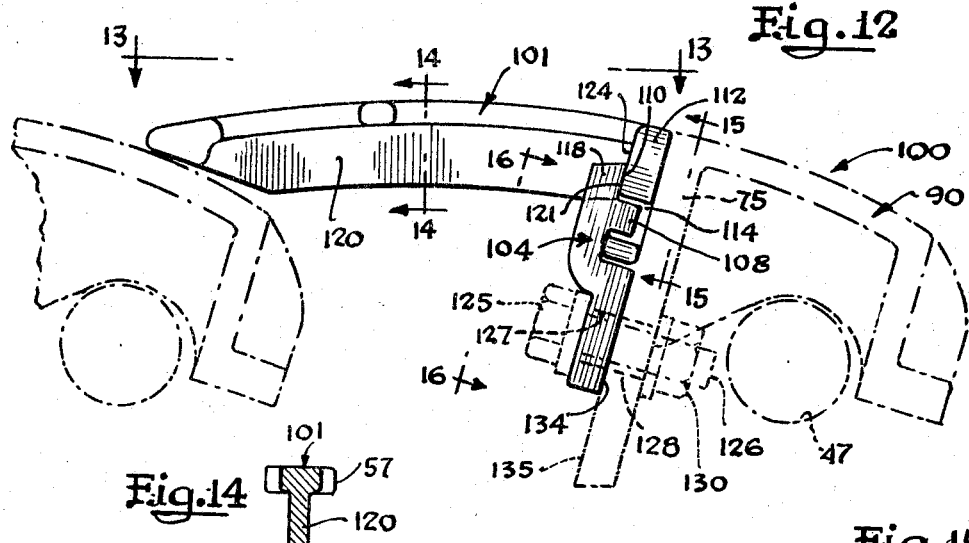
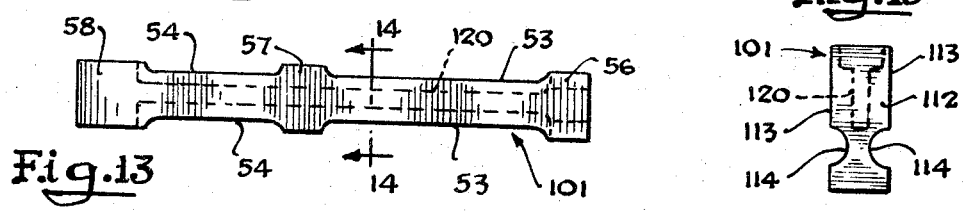
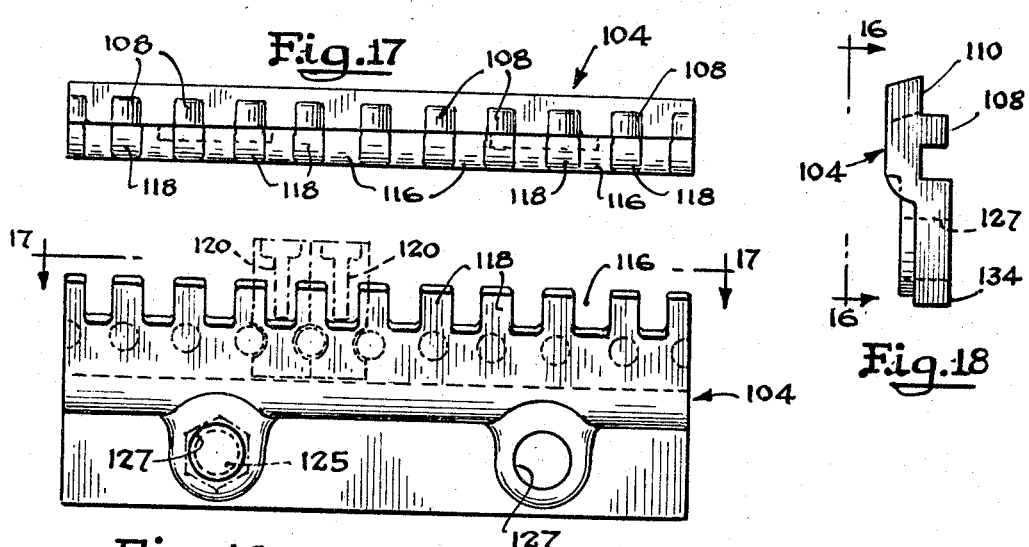
Inventor
Frank J. Boron
By Wallace, Kinzer and Dorn
Attorneys May 30, 1967 F. J. BORON 3,322,414
CONVEYOR APPARATUS
Filed March 1, 1965 4 Sheets-Sheet 4
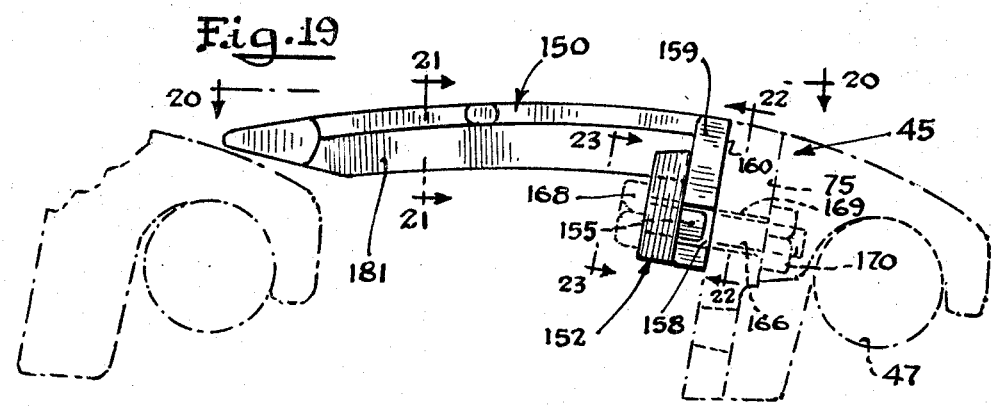
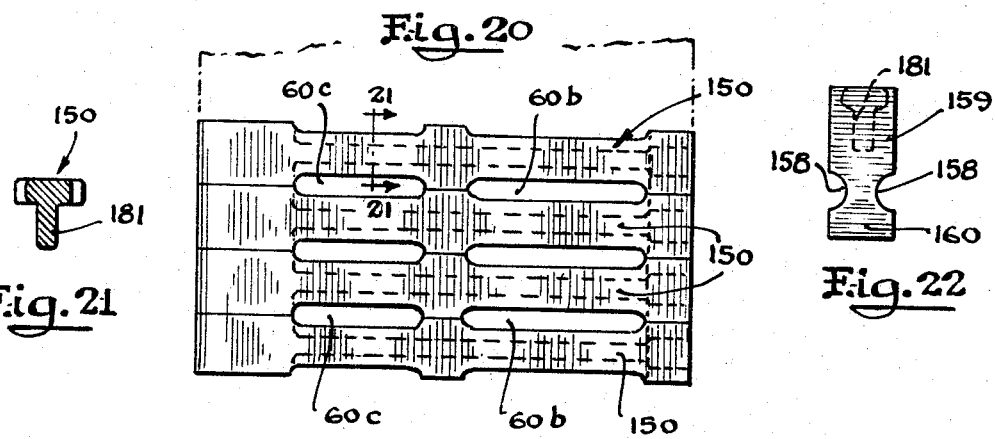
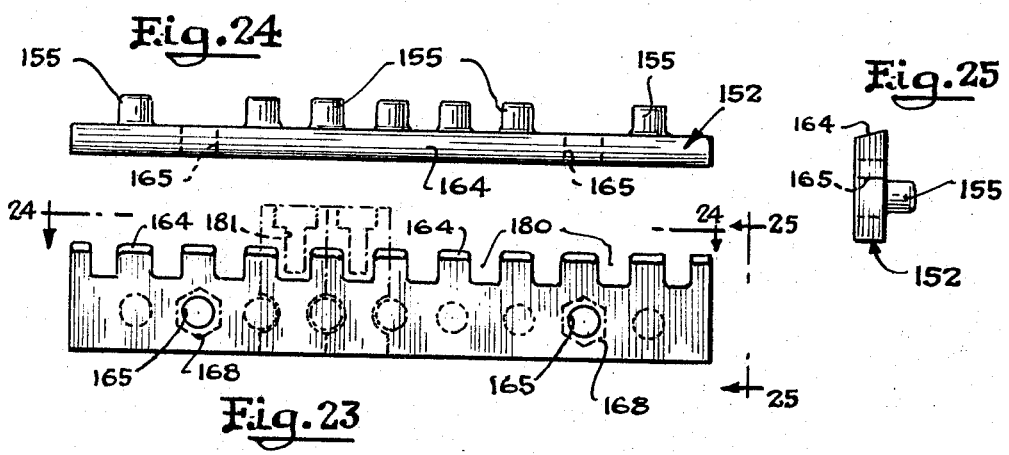
Inventor
Frank J. Boron
By Wallace, Kinzer and Dorn
Attorneys

United States Patent Office 3,322,414
Patented May 30, 1967

3,322,414
CONVEYOR APPARATUS
Frank J. Boron, Elyria, Ohio, assignor to Abex Corporation, a corporation of Delaware
Filed Mar. 1, 1965, Ser. No. 436,044
8 Claims. (Cl. 263—8)

This invention relates to a traveling grate and more particularly to grate elements and to assemblies of grate elements for carrying ore or the like while being subjected to relatively high temperatures.

The present invention is particularly directed to a traveling grate which serves as a conveyor and a grate for ore or the like which is being subjected to high temperature treatment during the passage of the ore or from one station to another station. Grate assemblies, constructed in accordance with the invention, are of particular utility in the so-called grate kiln system for production of high-grade iron pellets which are dried and pre-heated on the grate conveyor prior to being inserted into a rotary kiln. More particularly, in such a grate-kiln application green Taconite balls are deposited in a relatively wet state on the traveling grate and are moved through a drying and pre-heating furnace. The temperature of the air in the drying furnace is approximately 700° F. to 800° F. and this air is directed downwardly or upwardly through the iron pellets and through the grate conveyor. After drying, the Taconite pellets are conveyed by the grate conveyor into the pre-heat furnace, wherein air blasts of 1800° F. to 1900° F. are directed through the grate conveyor and through the Taconite pellets thereon to heat the pellets prior to being discharged into the inlet opening of a rotary kiln wherein the pellets are further processed. The grate assemblies of the traveling grate are heated to approximately 1400° F. at their highest temperature and are cooled down on the return conveyor run to approximately 300° F. Thus, the grate assemblies are subjected to cyclic expansion and contraction as well as high temperature abuse. Accordingly, an object of the present invention is an improvement in traveling grates for supporting ore, ore pellets or the like having an improved life and resistance to high temperature abuse and wear.

Another and more specific object of the present invention is sectionalizing the grates in a traveling grate conveyor to afford a plurality of individually and separate narrow in-width grate elements abutted together to constitute a carrying surface for the ore or the like being processed on the grate assembly.

Under this object of the invention, the grate surface for carrying the ore or the like is broken into a series of individually separate grate sections of a very narrow width which are abutted against one another to form a relatively continuous supporting grate surface for the ore. However, the relatively small air spaces at the interfaces of the abutted grate sections constitute thermo-barriers against the transmission of thermostresses or expansion stresses as in the case of relatively wide, integral one-piece grates. A problem with a non-sectionalized ore carrying grate surfaces is that of the development of localized areas of high temperature, that is hot spots, and the stressing of the metal under these temperature differentials. Thus, one portion of an integral, large grate may be considerably hotter than another portion of the same grate and the cooler portion restricts the expansion of the metal from the high temperature portion thereby causing the metal to go into plastic flow. Upon cooling, the metal contracts and thermo-cracks are formed at the surface which propagate and cause a deterioration and wear of the grate surface.

In accordance with the preferred embodiment of the invention and as an object thereof, the width of a grate section is approximately 1 inch so that the formation of a local hot spot in such a narrow grate section does not transmit the thermostresses or tensile or compressive stresses due to contraction and expansion across the air space to the next adjacent grate section.

The traveling grate in a typical grate-kiln employs a large number of grate assemblies, for example, approximately 1,800 such assemblies. With such large numbers of grate assemblies, individual grate sections or assemblies become loose or worn, particularly near the end period of use, such as 1½ to 2 years. Preferably, the replacement time in which to replace an individual grate assembly is limited to a very short period of time; for example, within a period of 1 minute, because of the high temperature increase on the grates when the conveyor is stopped and because of the high cost of lost production for shutdown time. Accordingly, another object of the invention is facilitating the assembly and disassembly of a traveling grate or grate conveyor having a plurality of sectionalized grate elements by securing the grate sections to constitute a unit or assembly, which is adapted to be readily assembled or disassembled from the supporting conveyor structure. Thus, under this object of invention, a plurality of individual grate elements are replaced or installed simultaneously thereby reducing the amount of time necessary for installation of sectionalized grates.

Another object of the invention is a new and improved manner of securing together by a retainer of a plurality of individual and separate grate elements to form a complete assembly for facilitating the assembly or disassembly of the individual grate sections. Under a more specific object of the invention, a one-piece retainer bar secures the individual grate elements together in side-by-side relationship by interlocking lugs and grooves on the grate elements and the retainer bar.

A more specific object of the invention is a grate having a plurality of trailing end portions separable from a forward portion of the grate, which end portions are held together in an assembled relationship by a retainer bar.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 3 is a view taken along the line 3—3 of FIG. 2 in the direction of the arrows showing a plurality of grate section secured together to constitute a sectionalized grate;

Figure 2:
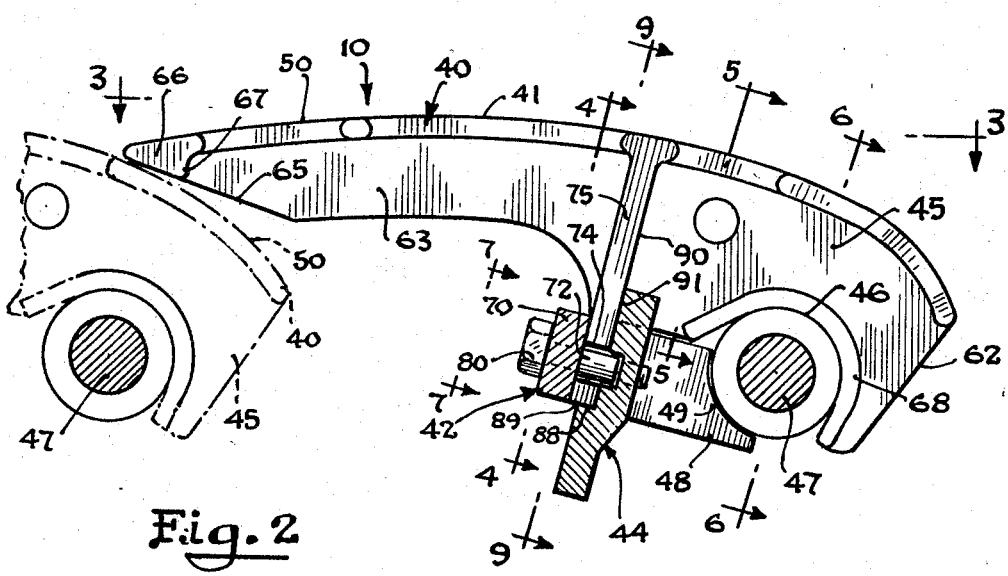
FIG. 2 is a side view of a conveyor grate section or element secured to a supporting shaft.

FIGS. 4, 5 and 6 are sectional views taken along the lines 4—4, 5—5, and 6—6, respectively, in the direction of the respective arrows and showing cross-sections of the grate elements of FIG. 2;

FIG. 7 is an elevational view of a retainer bar;

FIG. 8 is a view taken along the line 8—8 of FIG. 7, and showing the plan view of the retainer;

FIG. 9 is an elevational view of a plurality of grate sections secured together by a retainer bar;

FIG. 10 is a sectional view taken along the line 10—10 of FIG. 9 showing an interlocking bracket for articuately mounting a grate assembly on a support rod of a conveyor structure;

FIG. 11 is a plan view of the braket of FIG. 9;

FIG. 12 is an illustration of another embodiment of the invention, wherein the front and rear portions of the grate elements are separable from one another;

FIG. 13 is a view taken along the line 13—13 of FIG. 12 in the direction of the arrows showing in plan view the rearward grate element or portion of FIG. 12;

FIG. 14 is a sectional view taken along the line 14—14 of FIG. 13;

FIG. 15 is an end view taken along the line 15—15 of FIG. 12;

FIG. 16 is a view taken along the line 16—16 of FIG. 12 showing a retainer bar for the embodiment of the invention ilustrated in FIG. 12;

FIG. 17 is a plan view of the retainer casting taken along the line 17—17 of FIG. 16;

FIG. 18 is an end view of the retainer casting of FIG. 16;

FIG. 19 is an illustration of another embodiment of separable grate portions secured together by a retainer bar in accordance with the present invention;

FIG. 20 is a plan view taken along the line 20—20 of the sectionalized grate of FIG. 19.

FIG. 21 is a sectional view taken along the line 21—21 of FIG. 20;

FIG. 22 is an end view of a grate element of FIG. 20;

FIG. 23 is a view of the retainer bar of FIG. 19, taken along the line 23—23 in the direction of the arrows;

FIG. 24 is a plan view of the retainer bar of FIG. 23 taken along the line 24—24 of FIG. 23; and FIG. 25 is an end view of the retainer bar and taken along the line 25—25 of FIG. 23.

The present invention is directed to improved grates having ore carrying surfaces for transporting ore or the like through a high temperature area for heating or drying the ore or the like. The grates of the present invention are of particular utility in a grate-kiln line or system for processing iron pellets of green Taconite.

Figure 1:
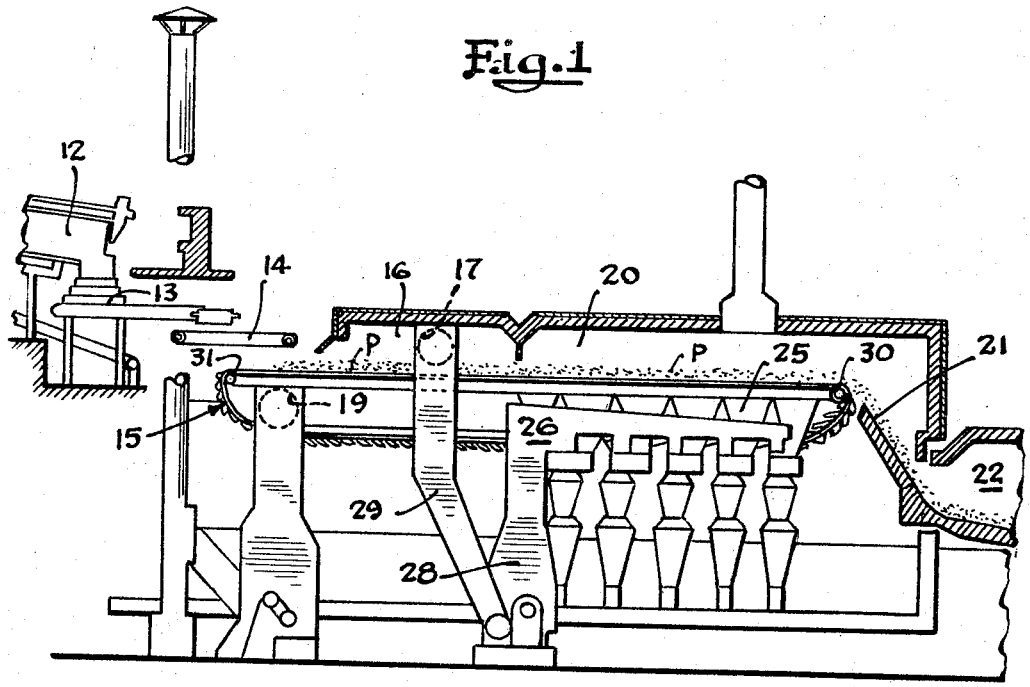
FIG. 1 is a diagrammatic illustration of a grate-kiln system having a traveling grate to which the present invention is particularly adapted for use therein.

More specifically, referring to FIG. 1, the green Taconite pellets are formed in a balling mill 12. The high-grade iron ore is mixed with a Bentonite clay and made into a pellet or ball in the balling drum 12 and then the pellets are moved across a seed screen 13 to a feeder conveyor 14. The green Taconite pellets are relatively moist and are lowered from the feeder conveyor 14 to the top surface of a traveling grate or grate conveyor 15. The traveling grate 15 transports the layer of pellets P thereon into a drying furnace 16 wherein the pellets are dried by hot air directed downwardly through the pellets from an overhead air supply header 17. Above the lower run of the grate conveyor 15, an air intake housing or wind box 19 draws the hot air, which is approximately 700° F. to 800° F., downwardly through the pellets and upper run of the traveling grate 15. Thus, the traveling grate 15 is being subjected to the severe conditions of wet moisture from green Taconite pellets and a rapid increase in temperature from the 700°–800° F. air moving thereover as the traveling grate moves through the drying furnace 16. The traveling grate conveyor moves from the left to right in the illustration of FIG. 1 and moves the pellets P from the drying furnace 16 into a preheated furnace 20 wherein the pellets are subjected to hot air at approximately 1800° F. to 1900° F. for preheating the pellets to a high temperature after which the pellets are discharged down a sloping trough 21 into a rotary kiln 22. The air temperature in the rotary kiln 22 is approximately 2400° F. and it is hot air from the kiln which is drawn upwardly and over the bed of the pellets P and into a series of preheated wind boxes 25 beneath the upper run of conveyor 15 at its discharge end. The air from the wind boxes 25 is drawn through a suitable duct work 26 to a fan 28 which then directs the air up through a duct work 29 to the header 17 for application to the pellets P in the drying furnace 16.

The traveling grate 15 is thus subjected to a continual increase in temperature from left to right as the individual grates move closer and closer to the kiln 22. After moving about a discharge sprocket 30, FIG. 1, adjacent the kiln 22, traveling grate 15 moves on the return conveyor run and the temperature of the traveling grate 15 is reduced to approximately 300° F. It is believed that the supporting surfaces of the grates on the traveling grate conveyor are heated to approximately 1200°–1400° F. at various portions thereof inasmuch as, it has been observed, that selected areas of these grate surfaces turn a red color from the heat applied thereto.

The grate sections or assemblies which make up the traveling grate 15 are preferably of cast iron thereby reducing the cost of the traveling grate 15 from that of a traveling grate of a high temperature alloy. The use of a cast iron grate assembly having sufficient life working under such adverse conditions, as above described, is facilitated by the unique design of the sectionalized grate assemblies of the present invention, as will be described hereinafter.

The supporting surface for the layer of pellets on the traveling grate 15 is afforded by the top surfaces 41 of each of the individual grate elements 40. The grate elements are articulated to a mounting or support bar 47 and are free to swing or pivot from a general horizontal position while moving along the top run of the conveyor to a generally hanging position after moving about the discharge conveyor sprocket 30, FIG. 1, and the grate elements 40 remain in this "hanging" condition through the return run of the conveyor. A series of support rods 47 are secured at spaced intervals across the width of the grate conveyor 15 to chains (not shown) which are driven to move the rods 47 and thereby the grate sections 40 about the endless path. The present invention is concerned with the grate sections 40 and assemblies of grate sections 40 which are held together by a retainer means such as the retainer bar 42 illustrated in FIG. 2.

A grate assembly, hereinafter designated by the general reference character 10, includes, as a matter of preference, ten individual grate sections. In the embodiment of the invention illustrated in FIGS. 2–11, inclusive, such a grate assembly 10 is pivotally secured to the support shaft 47 by an interlocking bracket 44.

The grate assemblies to which the present invention is particularly adapted, may be large structures in the order of approximately 96 feet in length and 12 feet in width. Such a grate conveyor would have approximately 3,600 grates. However, a grate conveyor 15 employing grate assemblies 10, FIG. 3, constructed in accordance with the preferred embodiment of the invention, each have ten separate grate sections or elements 40, FIG. 3. The smallest of the presently known traveling grates 15 is approximately 8 feet in width and has a length of 60 to 70 feet and employs approximately 1,800 to 2,000 grate assemblies and since each grate assembly, as the term is employed herein has ten individual grate elements or sections 40, the smallest grate conveyor would employ approximately 18,000 to 20,000 grate elements.

Each of the grate sectioas 40, FIG. 3, is slightly less than one inch in width as measured along the top surface 41. Each of the ten grate sections 40 has a length of approximately 12$^{15}\!/_{32}$ inches. It is to be understood that the length and the width of the individual grate sections 40 are cited by way of example only and the present invention is not limited to a particular number of castings in an assembly or to the size of the grate sections 40, as described herein.

The individual grate sections 40 each have a relatively wide top rib 50 extending width-wise, that is horizontally, and the top surfaces 41 of these ribs 50 constitute the approximate one-inch side, supporting surfaces for the pellets. With the castings abutted in the manner illustrated in FIG. 3, individual grooves 52, 53 and 54 formed along the edges of the grate sections are aligned between adjacent castings, to form a series of three slots 60a, 60b, and 60c. It is this plurality of slots 60a, 60b and 60c extending across the full length of the traveling grate, that permits the hot drying air of approximately 700° to 800° F. and the hotter preheating air of 1800° to 1900° F. to be drawn rapidly through the pellets resting on the top surfaces 41 and through these grate assemblies 10 into the wind boxes 25 and 19.

An important aspect of the present invention is a grate or grate assembly providing an improved resistance to wear and deterioration under the relatively high temperature and temperature differentials of a traveling grate conveyor. The interface of each sectionalized grate element constitutes a thermal barrier to stresses caused by localized heating of one grate element 40 relative to an adjacent grate element. Also, the side-by-side assembly of grate sections 40 affords slight air spaces in between the grate assemblies which permit expansion of a grate section 40 which is heated to a high temperature than one or more of its adjacent grate sections. With the one-piece, i.e. non-sectionalized grates of the prior art, the formation of a local hot spot, that is a localized high temperature area, caused stressing of the hotter metal from its surrounding cooler metal; and also, the cooler metal limited expansion of the hotter metal causing the hotter metal to flow, that is undergo a plastic flow. Thus, when the areas cool, as on the reverse or lower conveyor run, cracks are formed where the metal flowed because it was unable to expand.

The various sectional views of FIGS. 4, 5 and 6 illustrate generally T-shaped cross-sections formed by the upper rib 50 which is integrally joined to a normally extending, vertical rib 63. The rib 63 is a reinforcing rib and varies in length from a long front edge 62, FIG. 2, to a narrower length leading to an oblique rear surface 65 and a pointed or trailing end 66. The trailing end 66 is thickened at 67 from the thickness of web 50. Also, a transverse thickened web 68 is formed to encircle the shaft 47 and thus provides a larger bearing surface on the bottom of the rib 63 for articulation of the grate section 40.

The trailing ends 66 of the grate sections 40 are disposed in overlapping relationship to the forward end portions of its succeeding grate section 40 of the following grate assembly to afford a continuous grate conveyor surface for the pellets P in the lengthwise direction of the conveyor. The forward end portion 45 of each grate element 40 has its rib generally downward curving to be thus disposed beneath the trailing end portion 66 of the succeeding grate element and is thereby protected from direct contact with the ore pellets at the blast of the high temperature air impinging against the trailing ends 66 of the grate sections 40.

To facilitate construction of a traveling grate 15 and to facilitate repair of a traveling grate 15, it is preferred that five of the grate sections 40 be held in alignment by a retainer means such as a retainer 42 to constitute one-half of a grate assembly 10 which hereinafter will be referred to as a "bundle 68" of grate sections, FIG. 9.

For the purpose of interlocking the grate sections 40 with the retainer bar 42, the retainer bar 42 has a main body or plate portion 70 of generally rectangular configuration from which protrude interlocking means in the form of a pair of cylindrical lugs 72 and of a pair of semi-cylindrical lugs 73 and 74. The cylindrical lugs 72 are adapted to extend through an arculate aperture 74 formed in a transverse flange 75 which extends downwardly from the upper rib 50 of a retainer casting 42. The flange 75 is also a wider width than vertical rib 63 and extends transversely of the vertical rib 63. The semi-cylindrical lugs 73 at the ends of the retainer casting 42 are adapted to extend into apertures 74 of the transverse flange 75 of the outer two grate sections 40 of the bundle 68, as seen in FIG. 9.

The retainer bar 42 has a pair of circular apertures 78, FIG. 8, disposed equidistant between a lug 72 and its respective semi-cylindrical lugs 73. The shanks 79, FIG. 9, of attaching bolts 80 are inserted through the adjacent pair of semi-circular apertures 74 on outer most pairs of sections 40 of each bundle 68. The shanks 79 of the bolts 80 also extend through apertures 82 in the bracket 44. Nuts (not shown) are threaded on the ends of the bolts 80 to secure the five grate sections 40, the retainer bar 42, and the bracket 44 into a tight assembled unit.

The bracket 44 is provided with a pair of circular recesses 83, FIGS. 10 and 11, for receiving the end portions of the retaining lugs 72 on the retainer bar 70. At the outer edges of a plate portion 85 on the bracket 44, a pair of semi-circular recesses 86 are adapted to receive the semi-cylindrical lugs 73 and 74 of the bracket 44. As best seen in FIG. 2, the bracket 44 has a shoulder or ledge 88 for supporting the lower surface 89 of the transverse flange 75 of each of the grate sections 40. The transverse flange has a forward and generally vertical surface 90 disposed for relatively flush engagement with an opposing surface 91, FIGS. 2 and 10, on bracket 44 when the bolts 80 are tightened to secure the retainer 42 and bracket 44 tightly to the transverse flanges 75 of the five grate sections 40. Thus, the five respective arcuate surfaces 46 on the five grate sections 40 and the three arcuate surfaces 49 on the bracket 44, which is secured to the five grate sections 40 and the retainer bar 42, pivotally mount the half assembly to the supporting shaft 47.

The grate assemblies 10 are articulated to the supporting shaft 47 so as to be free for rotational movement about the shaft 47 from the position generally shown in FIG. 2 to the position shown in FIG. 1 on the downward return run of the conveyor wherein the grate sections hang in a generally downward direction. When reaching the sprockets 31 at the inlet portion of the traveling grate the generally downwardly hanging grate sections 40 are swung to a generally horizontal position to form a generally horizontal bed for carrying the pellets. To assure that the articulated grate sections 40 resume their horizontal position prior to receiving the pellets, a scraper bar (not shown) is adapted to engage and to cam downwardly to the generally horizontal position any of the grate assemblies 10 which have the tendency to remain upright after moving about the inlet sprocket 31. The articulation and camming of the grate sections 40 help to keep the grate sections 40 scraped from accumulations of material thereon and thereby helps prolong the life of the grate assemblies.

Referring now to FIGS. 12 and 18, there is illustrated another embodiment of the present invention, wherein the forward portion 90 of a grate section 100 is a separate and distinct casting from a trailing end portion 101. The front portion 90 of a grate assembly 100 is joined to the respective rearward portion 101 by a retainer means or bar 104. This is in contrast to the grate section 40 described hereinbefore, where the forward portion was integral with the rearward trailing end portion.

The forward portions of the grates have a longer life than the rearward portions thereof. The longer life of the forward portions of the grate sections is attributed to the overlapping of the forward portions by the trailing ends of the preceding grate sections. Thus, after the trailing ends 66 of a grate section have undergone considerable shortening, it is possible to salvage the forward portions including a transverse flange 75 by burning off or otherwise severing the shortened trailing ends at the transverse flange 75. The forward portion 90, illustrated in phantom lines in FIG. 12, was formed from a previous grate section having an integral trailing end 66. In fact, the front portion 90 of a grate assembly need not be sectionalized into the same one-inch wide crate sections, as set forth in the embodiment of the invention hereinbefore described in conjunction with FIGS. 2–9. The trailing end portions 101 have, in actual practice, been secured to the nonsectionalized, i.e. one-piece, forward portions of grates whose rearward portions have become worn and have been removed at the transverse flange 75, FIG. 12. Thus, the trailing end portions 101 can be secured to the transverse flange 75, FIG. 12, of a non-sectionalized forward portion 90 or to the transverse flanges 75 of the sectionalized forward portions 45, FIG. 2.

In the embodiment of the invention in FIGS. 12 to 18, the retainer bar 104 has interlocking means in the form of eight cylindrical lugs 108, FIG. 18, extending forwardly from a generally vertical surface 110. Each of the rearward trailing end portions 101 has a transverse web 112 at the forward end thereof adapted to be secured against the transverse flange 75 of the forward portion 90, FIG. 12. The transverse rib 112 has a semi-circular opening 114 along each of the opposite side edges 113 thereof to receive the mating and complementary shaped portions of retaining lugs 108 of the retainer bar 104.

As best seen in FIG. 16, the upper portion of the retainer bar 104 is combed or slotted by a series of openings 116 affording a plurality of projecting fingers 118, which are adapted to be disposed on either side of the web portion 120, of each of the retainer castings 101. As seen in FIG. 12, the forward and vertical surfaces 110 on the retainer bar 104 engage the rearward and generally vertical surface 124 of the transverse flange 112 of the respective castings 101. In this manner, considerable support is given to the individual grate castings 101 at the upper portions 112. In the embodiment of the invention in FIGS. 12 to 18, securing bolts 125 are inserted through openings 127 in the bottom of the retainer casting 104. The bolts 125 have their respective shank portions 126 extended through suitable apertures 128 in the flange 75 of the forward portion 90. Thus, when a nut 130 is tightened on each of the bolts 125, the retainer bar 104 is drawn tightly at its lower vertical surface 134 against the surface 135 on the flange 75 thereby forcing the lugs 108 into the series of holes formed by the openings 114 on the aligned retainer castings 101. A bracket (not shown) similar to the bracket 44 of the above described embodiment of the invention is also secured to the grate assembly 100, FIG. 12, to interlock the grate assembly 100 about the supporting shaft 47.

It is to be understood that in the embodiment of the invention illustrated in FIGS. 12 to 18 that the same general cross-sectional shape is employed for the rearward grate sections 101, as for the rearward portions of the grate sections 40. The assembled grate assembly 100 has the plurality of slots 60b and 60c formed by the abutting wide portions 56, 57 and 58, on the top surface of the retainers 101.

In the embodiment of the invention illustrated in FIGS. 19–25, a retainer bar 152 of a different configuration from the retainer bars 42 and 104, as hereinbefore described, affords another manner of connecting a plurality of rearward grate sections 150 to a non-sectionalized forward portion 90 or a corresponding number of forward grate sections 45. As seen in FIGS. 19–22, the rearward grate sections 150 have the same general cross-sectional configuration as the rearward grate sections 101, FIG. 12, and are assembled together in the manner hereinbefore described to form the slots 60b and 60c for the passage of the hot air through the grate assembly.

The retainer bar 152 is provided interlocking means including a series of forwardly extending retaining lugs 155 for insertion into the respective semi-circular openings 158, FIG. 22, formed in a transverse flange 159 located at the forward ends of each of the rearward grate sections 150. Each of the grate sections 150 has at its forward end a generally vertical surface 160 adapted for engagement with the transverse flange 75 of the forward grate sections 45. As best seen in FIG. 24, the retainer bar 152 is provided with a pair of spaced apertures 165 for receipt of the shanks 166, FIG. 19, of attaching bolts 168. Suitably placed holes 169 are formed in the transverse flange 75 of the forward grate sections 45 for receiving the shanks 166 of the securing bolts 168. Preferably, the upper surface of the grate bar 152 is serrated to provide a series of slots 180 for receipt of the reinforcing lower web portion 181 of each of the rearward grate sections 150. When the nuts 170 are tightened on the threaded ends of the securing bolts 168 the rectangular plate portion 164 of the retainer bar 152 is moved into flush and tight engagement with the transverse flanges 159 on the respective rearward grate sections 150 to secure the grate sections tightly against the forward grate sections 45 thereby constituting an assembly 10 having ten forward grate sections 45 and ten rearward grate sections 150 suitably aligned and restrained to complete a sectionalized grate assembly.

While not shown, it is to be understood that the grate assemblies shown in the embodiment of the invention in FIGS. 19–25 are secured to a supporting shaft 47 by castings having arcuate portions or encircling the lower portion of the rod 47 shown in FIG. 19. Thus, the grate assemblies are articulated to the supporting rod 47 in the manner hereinbefore described with the other embodiments of the invention.

From the foregoing, it is manifest that the present invention reduces the deterioration and wear of grates of traveling grates for supporting ore or the like undergoing a high temperature treatment. Also, the present invention provides thermal barriers to stresses caused by temperature differentials and provides for expansion of a high temperature area relative to a low temperature area thereby preventing plastic flow of the metal as in prior art grates. In one embodiment of the present invention, only the trailing portions such as 101, FIG. 12 or 150, FIG. 19, are sectionalized and are secured together by a retaining means; and in another embodiment of the invention the entire grate sections are sectionalized (as illustrated in FIGS. 2 and 3) and held together by a retaining means. It will be recognized from FIG. 2 in particular that the retainer is effective to support each grate section or element in a cantilever fashion.

Hence, while preferred embodiments of the invention have been described and illustrated, it is to be understood that they are capable of variation and modification, and I therefore do not wish to be limited to the precise details set forth, but desired to avail myself of such changes and alterations as fall within the purview of the following claims.

I claim:

1. A sectionalized grate element adapted to be secured together with other grate elements of like configuration to form a sectionalized grate assembly, said element having an upper surface of arcuate configuration for receiving materials thereon, an integral web portion extending normally downward from said upper surface, said rib joining said upper surface in a generally pointed end portion at one end of said grate element, the other end of said grate element having a transverse attaching flange for securing said grate element to said conveyor assembly, openings formed in the opposite sides of said attaching flange to provide interlocking portions for receiving a projection from a retainer for securing said grate element to said conveyor mechanism.

2. A retainer bar for use with a plurality of grate elements in sectionalized grate assemblies to hold said grate assemblies in an assembled conveyor relationship, comprising: a body adapted to span a plurality of said grate elements, a clamping surface on said body adapted to engage the plurality of grate elements along surfaces thereof to hold said grate elements in a cantilever fashion, a plurality of lugs integrally formed on said retainer bar for insertion into recesses in said grate elements, said body portion having apertures therein for receiving bolts for securing said retainer and grate elements to said conveyor assembly.

3. The retainer bar of claim 1 wherein the upper portion of the body is formed with a plurality of serrations for receiving portions of a grate element.

4. A sectionalized grate assembly for pivotal mounting on a conveyor mechanism, said grate assembly adapted for supporting ore or the like during high temperature treatment comprising: a plurality of elongated grate elements, each of said grate elements having an upper surface for carrying the ore, an elongated rib extending downwardly from said upper supporting surface of each of said grate elements, said upper surfaces having elongated grooves formed along at least a portion of the side edges of the upper surfaces to permit the flow of hot gas through the grate assembly, said grate elements each having an attaching flange extending normal to said rib having recesses therein, a separate retainer means for extension across the assembled grate elements in abutting relation to said flange to secure said grate elements in an assembled relationship, said retainer means including projection means for projecting into said recesses formed in said flanges to hold said grate elements in an assembled relationship, and fastener means for securing the retainer means to said flanges.

5. The grate assembly of claim 4 wherein a bracket means is secured to each of said grate elements and wherein said bracket means has arcuate surfaces for journaling said grate assembly for pivotal movement.

6. In a sectionalized grate assembly for pivotal mounting on a conveyor mechanism, said grate assembly adapted for transporting ore or the like under high temperatures, a plurality of grate elements abutted together and each having an upper surface for carrying the ore, an elongated rib extending downwardly from said upper supporting surface of each of said grate elements, each of said grate elements having an integral and downwardly extending flange attaching portion extending normal to said rib, a separate retainer adapted to extend across the assembled grate elements to secure said grate elements in an assembled relationship, cooperating projection and recess means on said retainer and attaching portion to hold said grate elements in an assembled relationship, and fastener means for securely joining the retainer to each attaching portion.

7. A grate assembly according to claim 6 wherein the upper surface of each grate element is of arcuate configuration, said rib joining said upper surface in a generally pointed end portion at one end of the grate element with said flange spaced forwardly of said pointed end portion.

8. A grate assembly according to claim 7 wherein the forward end of each grate element includes a bracket having an arcuate surface for journaling the grate elements on a supporting shaft for pivotal movement.

References Cited
UNITED STATES PATENTS

| | | | |
|---|---|---|---|
| 1,963,789 | 6/1934 | Holt | 110—40 |
| 2,955,812 | 10/1960 | Boron | 266—21 |
| 3,063,696 | 11/1962 | Culling | 266—21 |

FREDERICK L. MATTESON, JR., *Primary Examiner.*

JOHN J. CAMBY, *Examiner.*